United States Patent [19]

Smetana et al.

[11] Patent Number: 5,302,200
[45] Date of Patent: Apr. 12, 1994

[54] HYDRATING AND PLASTICIZING ADMIXTURE FOR DENSE CONCRETE

[75] Inventors: David A. Smetana; Alfonzo L. Wilson; Richard J. Lenczewski, all of Cleveland, Ohio

[73] Assignee: Specrete - IP Incorporated, Cleveland, Ohio

[21] Appl. No.: 800,604

[22] Filed: Nov. 27, 1991

Related U.S. Application Data

[63] Continuation-in-part of Ser. No. 526,244, May 18, 1990, abandoned, and a continuation-in-part of Ser. No. 571,549, Aug. 24, 1990, Pat. No. 5,114,617.

[51] Int. Cl.$^5$ .................. C04B 14/02; C04B 14/08
[52] U.S. Cl. .................. 106/482; 106/694; 106/705; 106/706; 106/718; 106/737; 106/DIG. 1; 264/DIG. 49
[58] Field of Search .............. 106/694, 695, 696, 698, 106/705, 706, 708, 709, 713, 718, 719, 724, DIG. 1, 737, 482; 264/DIG. 49

[56] References Cited

U.S. PATENT DOCUMENTS

| | | | |
|---|---|---|---|
| 4,120,736 | 10/1978 | Childs et al. | 106/698 |
| 4,385,935 | 5/1983 | Skjeldal | 106/721 |
| 4,623,682 | 11/1986 | Nicholson et al. | 524/3 |
| 4,741,782 | 5/1988 | Styron | 106/698 |
| 4,880,468 | 11/1989 | Bowlin et al. | 106/721 |
| 4,933,031 | 6/1990 | Blomberg et al. | 106/679 |
| 4,961,790 | 10/1990 | Smith et al. | 106/823 |

OTHER PUBLICATIONS

Kosmatka et al., "Design & Control of Concrete Mixtures", Thirteenth Edition, 1988, p. 64.

*Primary Examiner*—Mark L. Bell
*Assistant Examiner*—Michael Marcheschi
*Attorney, Agent, or Firm*—Pearne, Gordon, McCoy & Granger

[57] ABSTRACT

An admixture for a dense and durable concrete mix consisting essentially of diatomaceous earth and silica fume in the ratio of from 1 to 1 up to 1 to 8. Optionally, fly ash and lignosulfonate dispersant may be added to the admixture.

5 Claims, No Drawings

HYDRATING AND PLASTICIZING ADMIXTURE FOR DENSE CONCRETE

REFERENCE TO RELATED APPLICATIONS

This application is a continuation-in-part of U.S. patent application Ser. No. 07/526,244 filed May 18, 1990 entitled "A Silica Fume Hydrating and Plasticizing Admixture for Concrete", now abandoned.

This application is also a continuation-in-part of U.S. patent application Ser. No. 07/571,549 filed August 24, 1990 entitled "High Strength Structural Perlite Concrete", now U.S. Pat. No. 5,114,617.

BACKGROUND OF THE INVENTION

The present invention relates to concrete mixes utilizing silica fume, and is particularly useful in no slump concrete mixes using silica fume. Very fine grain pozzolans, such as silica fume, are used in concrete mixes in place of some of the cement, or in addition to it, to provide strength and/or to improve the impermeability and denseness of the concrete. The latter are desireable characteristics in concrete because they improve freeze-thaw resistance and resistance to chlorides and other aggressive agents which attack concrete.

Silica fume, when added to concrete by itself, has a high water demand, often requiring an additional pound of water for every pound of added silica fume in order to maintain constant slump and workability of the concrete. For wet cast or slumping concrete, it has been found necessary to reduce the water required to place the mix by using a high range water reducing agent in the mix in order to achieve an acceptable water-to-cement ratio. For no slump concrete, silica fume mixes using high range water reducers to reduce the water have not proved successful, particularly when such mixes are steam cured. High range water reducing agents, or superplasticizers, are expensive.

The use of diatomaceous earth and silica fume separately as pozzolans is well known. Diatomaceous earth is usually used in mass concrete applications for the purpose of reducing the heat of hydration.

Recognizing the essential physical characteristics of diatomaceous earth and silica fume is critical to this invention and to the successful use of both products. There are cellular particle pozzolans and non-cellular, solid particle pozzolans.

Silica fume is a very finely divided amorphous solid mineral pozzolan having a particle size of less than 5 microns and often a particle size in the neighborhood of 0.01 to 1.0 microns. It is generally believed that this ultra-fine size is necessary for providing tremendous surface area for reaction with cement/water hydration products. The ultra-fine, solid and hydrophobic silica fume particles tend to pack together, requiring either a substantial amount of water or, alternatively, a potent high range water reducing agent for wetting and dispersion. Since the silica fume particles are solid, they must rely on available water from the concrete matrix for continued hydration, or from water provided externally from a curing environment, either from mist or from submergence in water. The problem with dispersing silica fume with water only is that the water/cement ratio becomes unacceptably high. The problem with dispersing silica fume with potent high range (anionic) water reducing agents is that there is insufficient water for both the cement and the silica fume particles to hydrate when subjected to an air environment. The dilemma that has been facing the concrete industry is that silica fume concrete behaves acceptably well in a laboratory environment when cured in a mist room or when submerged in water. It does not perform well when subjected to an air curing environment during the first 10 to 28 days, which is usually the case in field use. In an air curing environment, a concrete mix of cement, silica fume, water and high range water reducing agents often performs poorly because the cement and the silica fume are competing for a limited and insufficient amount of hydration water. Unhydrated silica fume is known to cause micro-cracking in the micro-structural concrete matrix.

Diatomaceous earth is a cellular particle mineral pozzolan having an average size of greater than 5 microns and less than 20 microns. As a cellular particle, diatomaceous earth can absorb up to 2 times its dry weight in water. The cell structure of diatoms in diatomaceous earth is such that the water absorbed into its cells is tenaciously bound. This differs from other cellular materials such as cellulose which absorb water quickly, but give it up at an equally rapid rate. Diatomaceous earth has a large surface area for a given particle size because of its cellular make-up, as opposed to silica fume which is round, smooth and solid. In that diatomaceous earth can internally retain moisture, moist curing is not such a critical factor for concrete containing diatomaceous earth because the relatively large volume of water contained in the diatomaceous earth can feed the hydration of cement as well as the hydration of the diatomaceous earth. We believe that the rate at which the diatomaceous earth gives up its water is quite ideally suited to the rate at which all of the hydrating products in a concrete matrix can use the water for the hydrating process. Consequently, diatomaceous earth concrete performs well in an air-cured environment during the first 10 to 28 days, and thereafter, Without the hydrating and micro-cracking problems as experienced with the use of silica fume by itself. The limitation of diatomaceous earth as a pozzolan is that it can not, on a pound for pound basis, achieve the high strength and durability quality of moist cured silica fume concrete compositions.

SUMMARY OF THE INVENTION

We have found that a pozzolan comprising a mixture of silica fume and diatomaceous earth when added to cement in a concrete mixture in certain proportions provides unexpected and superior results in that the benefits of the silica fume are obtained without the disadvantages, in both no slump concrete and in medium to high slump concrete.

Diatomaceous earth has a grain size intermediate than that of silica fume and that of cement and acts as a plasticizer and source of accessible curing water for the silica fume. Diatomaceous earth is hydrophilic and silica fume is hydrophobic.

We have further found that if fly ash, which has a grain size larger than that of diatomaceous earth, and a lignosulfonate or other dispersant, instead of a high range water reducing agent, is blended with an admixture including diatomaceous earth and silica fume in a concrete mix, a no slump concrete mix may be formulated in accordance with good concrete practice with the mix having good moldability and placeability. The mix can be cured by steam heating to provide a concrete of very high strength and density.

DESCRIPTION OF THE PREFERRED EMBODIMENTS

In concrete mixes in accordance with the present invention, the silica fume, on a cement replacement basis in fine grained concrete, normally replaces from about 4 to about 20 percent of the cement. However, in some mixes, the silica fume may replace a lesser amount of cement. For example, in a mix for concrete block, the silica fume may replace as little as 2.5 percent of the cement. In the concrete mixture of this invention, there should be at least 2.5 parts of silica fume for each 100 parts of cement.

There should be from 1 part of diatomaceous earth for each part of silica fume up to 1 part of diatomaceous earth for 8 parts of silica fume. The preferred range is from 1 part of diatomaceous earth to 2 parts of silica fume up to 5 parts of silica fume.

In formulating a mix, the fly ash and silica fume preferably have a relationship to each other such that either constitutes 40 to 60 percent of the combined weight of the fly ash and silica fume. The combined weight of the silica fume and fly ash should be no more than 10 times the weight of the diatomaceous earth.

The fly ash has a larger grain size than the silica fume and acts as a dispersant when dry blending the silica fume into an admixture with diatomaceous earth.

The lignosulfonate functions primarily as a plasticizing dispersant in the concrete mix to wet out the particles in the mix. The dosage of the lignosulfonate is small so that it has little or no water reducing effect in the mix. There should be from about 0.05 up to 0.2 percent by weight of dispersant per 100 parts of cementitious materials.

In a no slump mix, there preferably are no high range water reducing agents, or superplasticizers. In a medium to high slump mix, it may be necessary to add from ½ to 1% by weight of the cementitious material of a high range water reducing agent.

The ratio of cementitious material to water should be from about 0.27 to about 0.6. In other words, for 100 pounds of cementitious material, you can have up to 60 pounds of water. As known by those skilled in the art of concrete mixing procedures, in calculating this ratio, the aggregates and other ingredients in the mixture are assumed to be in the saturated surface dry condition. This ratio provides for dispersing of the silica fume and the other particles of the mix as well as workability and sufficient water for hydration and loss of free water by the steam curing process or air curing. Enough water should be used in the concrete mix to saturate the diatomaceous earth. The diatomaceous earth may be predampened with water to a saturated surface dry condition.

One practical advantage of predampening the diatomaceous earth to a saturated surface-dry condition is that an admixture, comprised of a blend of fine grain pozzolans, powdered dispersants and predampened diatomaceous earth, can be prepared which is relatively non-dusting.

Specific mixes utilizing the present invention are as follows.

| Mix | A (lbs.) | B (lbs.) | C (lbs.) | D (lbs.) | E (lbs.) |
|---|---|---|---|---|---|
| Cement | 600 | 500 | 400 | 570 | 587 |
| Sand | 2344 | 2643 | 2735 | 2625 | 2570 |
| Perlite | 110 | 80 | 80 | 80 | 78 |
| Silica Fume | 27 | 35 | 47 | 37 | 34 |
| Diatom. Earth | 10 | 15 | 20 | 10 | 11.5 |
| Fly Ash | 30 | 35 | 35 | 35 | 39 |
| Lignosulfonate | .6 | .5 | .75 | .5 | .5 |
| Water | 235 | 236 | 246 | 286 | 291 |

Mixes D and E are essentially the same mixes with mix D being adjusted for a cubic yard of concrete as well as having a small adjustment in the ratio of silica fume to fly ash.

In mix A, the perlite is an uncoated expanded perlite while the perlite in the other mixes is an expanded perlite which has been coated with an organic siloxane sealant.

While the mixes A through C reveal the desirability of using a silica fume admixture as outlined with a fine grain concrete of cement, sand, a lightweight aggregate, a diatomaceous earth pozzolan and an admixture of silica fume, fly ash and lignosulfonate, the mixes of columns D and E, when tested in a Spancrete casting machine to manufacture a concrete plank having lengthwise apertures therethrough and pretensioned wire extending through the base of the plank had highly satisfactory workability and placeability and the resulting plank exhibited high strength and a tenacious bond between the concrete and the pretensioned strands.

The mix of column E on a cubic yard basis works out approximately as follows:

| | |
|---|---|
| Cement | approximately 590 pounds |
| Sand | approximately 2,600 pounds |
| Perlite | approximately 78 pounds |
| Silica Fume | approximately 34 pounds |
| Diatomaceous Earth | approximately 12 pounds |
| Fly Ash | approximately 39 pounds |
| Lignosulfonate | approximately .5 pounds |

The silica fume admixture of the present invention, including fly ash and lignosulfonate, gives a significant improvement in placeability and hydration over other mixes and enables high strength no slump concrete structures using silica fume to be molded with good results.

The resulting hardened concrete composite of the mix of column E, when tested for freeze-thaw durability and impermeability exhibited unexpectedly excellent results. In testing the freeze-thaw durability of this composite, concrete test specimens were subjected to 24 cycles of freezing the concrete for 12 hours and thawing the concrete for 12 hours, in accordance with test 502-3P of the New York State Department of Transportation. The test specimens showed no visible or measurable deterioration due to this vigorous environmental exposure. Also, in another test, in accordance with AASHTO T277, test specimens of the same concrete were prepared and tested for their impermeability to chloride penetration. This penetration is measured in coulombs, as is well known in the art. The test specimens exhibited a coulomb penetration of only 600 coulombs at 90 days of age. Any concrete having a coulomb rating of less than 1000 is considered to have very low permeability quality. We believe that optimizing the particle size distribution of the fine grain, intermediate grain and coarser grain pozzolanic and cementing materials of the cement paste is important to the successful practice of our invention.

The perlite used in the above mixes is a proprietary expanded perlite referred to as a smooth-surfaced, vesicular, expanded perlite developed by Specrete Corporation of Cleveland, Ohio. The perlite is described in U.S. patent application Ser. No. 07/571,549 filed Aug. 24, 1990 and entitled "High Strength Structural Perlite Concrete." The perlite weighs approximately 10 pounds per cubic foot and has an expansion factor on the order of 0.15-0.20 percent to the concrete.

Silica fume is a very fine non-crystalline silica produced by electric arc furnaces as a by-product of the production of metallic silicon or ferrosilicon alloys. It may be obtained from Elkem Materials Inc., 10 Parkway View Drive, Pittsburgh, Pa. 15205.

As previously stated, silica fume has a solid particle structure and is very fine, less than 5 microns in diameter with most particles under 1 micron in diameter. Another fine grain pozzolan which may be used in our invention in place of some of the silica fume or instead of silica fume, which acts much like silica fume, is finely ground rice hull ash. This material is described in U.S. Pat. No. 4,105,459. Rice hull ash is amorphous. It should be dry ground into a fluffy powder with particle sizes in the order of 8 to 10 microns. In this application, the term "fine grain pozzolan" is intended to cover silica fume and finely ground rice hull ash and any mixtures thereof. Rice hull ash may be obtained from Agrilectric Power Partners Inc. of Lake Charles, La.

Diatomaceous earth is a naturally occurring friable earth material composed of nearly pure hydrous amorphous silica and consisting essentially of the frustules of microscopic plant called "diatoms." One diatomaceous earth product is DIATOMITE D4C sold by Grefco Inc. of Los Angeles, Calif. Diatomaceous earth is a cellular plasticizing, water storing pozzolan which provides accessible water for curing. The average particle size is 10 to 20 microns. Ninety percent of the particles pass through a 325 mesh (45 micron) screen.

Diatomaceous earth absorbs up to two pounds by weight of water per pound of diatomaceous earth. Diatomaceous earth has the ability to store water and then release it gradually over time to the cementitious materials in the curing process.

Fly ash is the finely divided residue resulting from the combustion of ground or powered coal and which is transported from the firebox through the boiler by flue gasses. For purposes of our invention, we prefer class F or Class C fly ash as defined by The American Concrete Institute. Fly ash particles are of about the same particle size as cement.

Any lignosulfonate which acts as a plasticizing dispersant and meets the requirements of ASTM 494 "Standard Specifications for Chemical Admixtures for Concrete" may be used. We prefer calcium lignosulfonates. Suitable sources of lignosulfonates are Wesco Technology of Seattle, Wash., and Southland Corporation of Chicago, Ill. Hydroxycarboxylic acid plasticizing dispersants may be used in place of a lignosulfonate. The lignosulfonate is preferably in the form of a dry powder.

A suitable high range water reducing agent is BOREM 100 HMP. This is an anionic polymeric material which places a strong negative charge on the particles in solution. BOREM 100 HMP is sold by Borden & Remington Corp. of Fall River, Mass.

While perlite, which is lightweight fine aggregate, has been used in the foregoing examples, the present invention contemplates the use of other aggregates such as a fine sand, blast furnace fine aggregate, crushed coarse aggregate, or pulverized concrete aggregate in place of the perlite although the latter will produce a heavier concrete. The present invention is not dependent on the particular aggregate. A portion of the fine aggregate may be replaced by coarse aggregate.

Although the present invention has special application to a no slump concrete, it is not limited to no slump or low slump mixes. It may be employed wherever a dense, durable concrete is required.

While the invention has been shown and described with respect to particular embodiments thereof, the examples are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiment herein described, nor in any other way that is inconsistent with the extent to which the progress in the art has been advanced by the invention.

What we claim is:

1. An admixture for a concrete mix consisting essentially of silica fume and diatomaceous earth in the parts by weight ratio of 1 part of diatomaceous earth for 1 part of silica fume up to 1 part of diatomaceous earth for 8 parts of silica fume.

2. An admixture for a concrete mix, the admixture consisting essentially of silica fume, diatomaceous earth, fly ash, and a powdered dispersant in which said silica fume and said fly ash have a combined weight in which silica fume constitutes from about 40 to about 60 percent of the combined weight, the combined weight being not more than eight times greater than the weight of the diatomaceous earth.

3. An admixture for a concrete mix consisting essentially of a fine grain pozzolan selected from the group consisting of silica fume and rice hull ash and mixtures thereof and a diatomaceous earth water storing pozzolan in the ratio of 1 part of diatomaceous earth for 1 part of fine grain pozzolan.

4. An admixture for a concrete mix consisting essentially of a silica fume fine grain pozzolan and a diatomaceous earth water storing pozzolan in the ratio of 1 part of diatomaceous earth for 2 parts of silica fume up to 1 part of diatomaceous earth for 5 parts of silica fume.

5. The admixture of claims 1, 2, 3 or 4 in which the diatomaceous earth is predampened to a saturated surface-dry condition.

* * * * *

UNITED STATES PATENT AND TRADEMARK OFFICE
CERTIFICATE OF CORRECTION

PATENT NO. : 5,302,200

DATED : April 12, 1994

INVENTOR(S) : David A. Smetana, et al.

It is certified that error appears in the above-identified patent and that said Letters Patent is hereby corrected as shown below:

Column 3, line 7, after "cement." insert --In this description, all references to percents and parts are by weight.--.

Column 6, line 53, after "pozzolan" insert --up to 1 part of diatomaceous earth for 8 parts of fine grain pozzolan--.

Signed and Sealed this

Twenty-second Day of November, 1994

Attest:

BRUCE LEHMAN

*Attesting Officer*   *Commissioner of Patents and Trademarks*